United States Patent
Timmers et al.

(10) Patent No.: US 8,470,441 B2
(45) Date of Patent: Jun. 25, 2013

(54) CABLE WIRE PREPARED USING DISTANNOXANE CATALYSTS

(75) Inventors: Francis J. Timmers, Midland, MI (US); Bharat Indu Chaudhary, Princeton, NJ (US); Michael J. Mullins, Lake Jackson, TX (US); Roger L. Kuhlman, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 839 days.

(21) Appl. No.: 12/066,746

(22) PCT Filed: Aug. 25, 2006

(86) PCT No.: PCT/US2006/033310
§ 371 (c)(1),
(2), (4) Date: Mar. 13, 2008

(87) PCT Pub. No.: WO2007/032885
PCT Pub. Date: Mar. 22, 2007

(65) Prior Publication Data
US 2008/0277137 A1 Nov. 13, 2008

Related U.S. Application Data

(60) Provisional application No. 60/716,767, filed on Sep. 13, 2005.

(51) Int. Cl.
*B32B 15/00* (2006.01)
*H01B 3/44* (2006.01)

(52) U.S. Cl.
USPC ..... 428/379; 428/375; 428/383; 174/110 SR; 174/110 PM; 427/117; 427/118

(58) Field of Classification Search
None
See application file for complete search history.

(56) References Cited

U.S. PATENT DOCUMENTS 3,862,919 A * 1/1975 Nitzsche et al. ............ 528/18
4,005,056 A * 1/1977 Dunwald et al. ............ 528/45

(Continued)

FOREIGN PATENT DOCUMENTS

EP 1304354 B1 1/2007
GB 2278350 A 11/1994

(Continued)

OTHER PUBLICATIONS

Pesneau, et al., Journal of Cellular Plastics, vol. 38, Sep. 2002, pp. 421-440.

(Continued)

*Primary Examiner* — Jill Gray
(74) *Attorney, Agent, or Firm* — Whyte Hirschboeck Dudek S.C.

(57) ABSTRACT

A fabricated article (e.g., jacketed or insulated wire or cable) is prepared by a process comprising the steps of: applying a coating of a moisture-curable composition onto a wire or cable; and reacting the moisture-curable composition with water, wherein the moisture-curable composition comprises at least one resin having hydrolysable reactive silane groups and a tin catalyst characterized by the tin having a +4 oxidation state and a bis(alkoxide) ligand. The product of the process includes a wire or cable comprising a jacket, wherein the jacket comprises at least one poly olefin resin having hydrolysable reactive silane groups and a tin catalyst, the tin catalyst having a bis(alkoxide) ligand and characterized by the tin having a +4 oxidation state. The product of the process also includes a wire or cable comprising a jacket wherein the jacket comprises (i) the reaction product of at least one polyolefin resin having hydrolysable reactive silane groups and water, and (ii) at least one tin catalyst, the tin catalyst having a bis(alkoxide) ligand and characterized by the tin having a +4 oxidation state.

14 Claims, 4 Drawing Sheets

U.S. PATENT DOCUMENTS

| | | | |
|---|---|---|---|
| 4,026,853 A * | 5/1977 | Dressnandt et al. | 524/705 |
| 4,076,698 A | 2/1978 | Anderson et al. | |
| 4,206,098 A | 6/1980 | Sattler et al. | |
| 4,211,729 A * | 7/1980 | Marquardt et al. | 525/106 |
| 4,221,687 A * | 9/1980 | Minagawa et al. | 524/114 |
| 4,297,310 A | 10/1981 | Akutsu et al. | |
| 4,584,336 A * | 4/1986 | Pate et al. | 524/443 |
| 4,859,810 A * | 8/1989 | Cloetens et al. | 174/110 PM |
| 4,950,541 A | 8/1990 | Tabor et al. | |
| 5,244,966 A * | 9/1993 | Hergenrother et al. | 524/572 |
| 5,244,982 A | 9/1993 | Gondard et al. | |
| 5,492,760 A * | 2/1996 | Sarma et al. | 428/378 |
| 5,604,033 A * | 2/1997 | Arthurs et al. | 428/350 |
| 6,005,055 A | 12/1999 | Dammert et al. | |
| 6,228,969 B1 * | 5/2001 | Lee et al. | 528/80 |
| 6,465,547 B1 * | 10/2002 | Jackson et al. | 524/71 |
| 7,632,574 B2 * | 12/2009 | Kensicher et al. | 428/523 |
| 2002/0019487 A1 * | 2/2002 | Valligy et al. | 525/232 |
| 2003/0096904 A1 * | 5/2003 | Hakuta et al. | 524/588 |
| 2004/0202956 A1 * | 10/2004 | Takahashi et al. | 430/270.1 |
| 2006/0019106 A1 * | 1/2006 | Quemin et al. | 428/447 |
| 2006/0079605 A1 * | 4/2006 | Sato et al. | 523/176 |
| 2008/0277137 A1 * | 11/2008 | Timmers et al. | 174/110 S |
| 2010/0027948 A1 * | 2/2010 | Wasserman et al. | 385/101 |
| 2010/0087579 A1 * | 4/2010 | Cogen et al. | 524/436 |
| 2010/0120953 A1 * | 5/2010 | Aarts et al. | 524/176 |
| 2010/0203276 A1 * | 8/2010 | Wasserman et al. | 428/36.9 |

FOREIGN PATENT DOCUMENTS

| | | |
|---|---|---|
| WO | 0212354 A1 | 2/2002 |
| WO | 0212355 A1 | 2/2002 |
| WO | 2010074925 A1 | 7/2010 |

OTHER PUBLICATIONS

Zschunke, et al., Journal of Organometallic Chemistry, 112 (1976) 273-276.

Kricheldorf, et al., Macromolecules, vol. 29, No. 5, 1996, pp. 1375-1381.

Bates et al., Journal of Organometallic Chemistry, 363 (1989) pp. 45-60.

H. Randall Parker, Modern Plastics Encyclopedia 1989, pp. 264-268.

Christopher Irwin, Modern Plastics Encyclopedia 1989, pp. 217-218.

Michael W. Green, Modern Plastics Encyclopedia 1989, pp. 270-272.

Moore, et al. Polypropylene Handbook: Polymerization, Characterization, Properties, Processing, Applications, 1996, pp. 3-14.

Moore, et al. Polypropylene Handbook: Polymerization, Characterization, Properties, Processing, Applications, 1996, pp. 113-176.

Goutille, et al., Polymer 44 (2003), pp. 3165-3171.

Sen et al., Journal of Applied Polymer Science, vol. 44 (1992) pp. 1153-1164.

* cited by examiner

CABLE WIRE PREPARED USING DISTANNOXANE CATALYSTS

FIELD OF THE INVENTION

This invention relates to silane crosslinking compositions and condensation reactions. In one aspect, the invention relates to moisture-curable, silane crosslinking compositions while in another aspect, the invention relates to such compositions comprising a distannoxane catalyst. In yet another aspect, the invention relates to silane crosslinked articles that were moisture-cured through the action of a distannoxane catalyst.

BACKGROUND OF THE INVENTION

Silane-crosslinkable polymers, and compositions comprising these polymers, are well known in the art, e.g., U.S. Pat. No. 6,005,055, WO 02/12354 and WO 02/12355. The polymer is typically a polyolefin, e.g., polyethylene, into which one or more unsaturated silane compounds, e.g., vinyl trimethoxysilane, vinyl triethoxysilane, vinyl dimethoxyethoxysilane, etc., have been incorporated. The polymer is crosslinked upon exposure to moisture typically in the presence of a catalyst. These polymers have found a myriad of uses, particularly as insulation coatings in the wire and cable industry.

Important in the use of silane-crosslinkable polymers is their rate of cure. Generally, the faster the cure rate, the more efficient is their use. Polymer cure or crosslinking rate is a function of many variables not the least of which is the catalyst. Many catalysts are known for use in crosslinking polyolefins which bear unsaturated silane functionality, and among these are metal salts of carboxylic acids, organic bases, and inorganic and organic acids. Exemplary of the metal carboxylates is di-n-butyldilauryl tin (DBTDL), of the organic bases is pyridine, of the inorganic acids is sulfuric acid, and of the organic acids are the toluene and naphthalene didistannoxanes. While all of these catalysts are effective to one degree or another, new catalysts are of continuing interest to the industry, particularly to the extent that they are faster, or less water soluble, or cause less discoloration to the crosslinked polymer, or offer an improvement in any one of a number of different ways over the catalysts currently available for this purpose.

BRIEF SUMMARY OF THE INVENTION

In one preferred embodiment, the invention is an article that comprises at least one polymer or resin, preferably a poly olefin resin, having hydrolysable reactive silane groups and a tin catalyst, the tin catalyst having a bis(alkoxide) ligand and characterized by the tin having a +4 oxidation state. In certain embodiments, the inventive articles can be wire or cable jackets, insulation or semi-conductive layers; pipes; and foams.

In another preferred embodiment, the invention is an article that comprises (i) the reaction product of at least one polymer or resin, preferably a polyolefin resin, having hydrolysable reactive silane groups and water, and (ii) at least one tin catalyst, the tin catalyst having a bis(alkoxide) ligand and characterized by the tin having a +4 oxidation state. In certain embodiments, the inventive articles can be wire or cable jackets, insulation or semi-conductive layers; pipes; and foams.

In yet another preferred embodiment, the invention is a process for preparing a jacketed or insulated wire or cable, the process comprising the steps of: applying a coating of a moisture-curable composition onto a wire or cable; and reacting the moisture-curable composition with water, wherein the moisture-curable composition comprises at least one resin having hydrolysable reactive silane groups and a tin catalyst characterized by the tin having a +4 oxidation state and a bis(alkoxide) ligand.

DETAILED DESCRIPTION OF THE INVENTION

Figure 1:
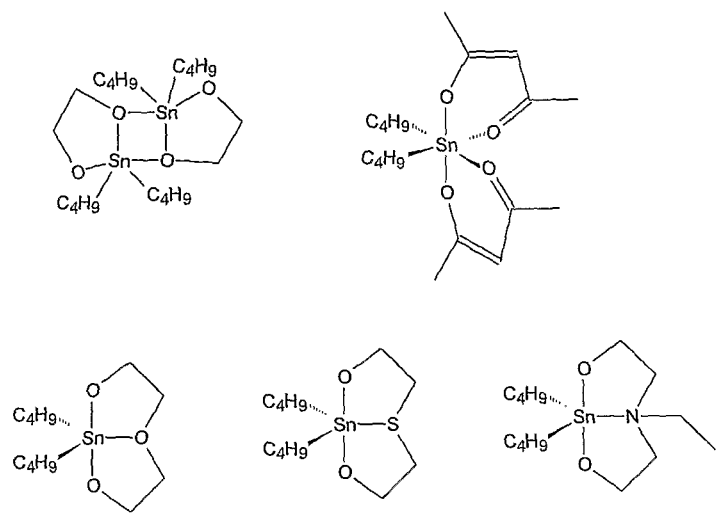
FIG. 1 shows the chemical structure of penta-coordinate and hexa-coordinate tin catalysts.

The silane crosslinkable polymer compositions of this invention comprise (i) at least one silane crosslinkable polymer, and (ii) a catalytic amount of at least one distannoxane catalyst. The silane crosslinkable polymers include silane-functionalized olefinic polymers such as silane-functionalized polyethylene, polypropylene, etc., and various blends of these polymers. Preferred silane-functionalized olefinic polymers include (i) the copolymers of ethylene and a hydrolysable silane, (ii) a copolymer of ethylene, one or more $C_3$ or higher α-olefins or unsaturated esters, and a hydrolysable silane, (iii) a homopolymer of ethylene having a hydrolysable silane grafted to its backbone, and (iv) a copolymer of ethylene and one or more $C_3$ or higher α-olefins or unsaturated esters, the copolymer having a hydrolysable silane grafted to its backbone.

Polyethylene polymer as here used is a homopolymer of ethylene or a copolymer of ethylene and a minor amount of one or more α-olefins of 3 to 20 carbon atoms, preferably of 4 to 12 carbon atoms, and, optionally, a diene or a mixture or blend of such homopolymers and copolymers. The mixture can be either an in situ blend or a post-reactor (or mechanical) blend. Exemplary α-olefins include propylene, 1-butene, 1-hexene, 4-methyl-1-pentene and 1-octene. Examples of a polyethylene comprising ethylene and an unsaturated ester are copolymers of ethylene and vinyl acetate or an acrylic or methacrylic ester.

The polyethylene can be homogeneous or heterogeneous. Homogeneous polyethylenes typically have a polydispersity (Mw/Mn) of about 1.5 to about 3.5, an essentially uniform comonomer distribution, and a single, relatively low melting point as measured by differential scanning calorimetry (DSC). The heterogeneous polyethylenes typically have a polydispersity greater than 3.5 and lack a uniform comonomer distribution. Mw is weight average molecular weight, and Mn is number average molecular weight.

The polyethylenes have a density in the range of about 0.850 to about 0.970 g/cc, preferably in the range of about 0.870 to about 0.930 g/cc. They also have a melt index ($I_2$) in the range of about 0.01 to about 2000 g/10 min, preferably about 0.05 to about 1000 g/10 min, and most preferably about 0.10 to about 50 g/10 min. If the polyethylene is a homopolymer, then its $I_2$ is preferably about 0.75 to about 3 g/10 min.

The $I_2$ is determined under ASTM D-1238, Condition E and measured at 190 C and 2.16 kg.

The polyethylenes used in the practice of this invention can be prepared by any process including solution, slurry, high-pressure and gas phase using conventional conditions and techniques. Catalyst systems include Ziegler-Natta, Phillips, and the various single-site catalysts, e.g., metallocene, constrained geometry, etc. The catalysts are used with and without supports.

Useful polyethylenes include low density homopolymers of ethylene made by high pressure processes (HP-LDPEs), linear low density polyethylenes (LLDPEs), very low density polyethylenes (VLDPEs), ultra low density polyethylenes (ULDPEs), medium density polyethylenes (MDPEs), high density polyethylene (HDPE), and metallocene and constrained geometry copolymers.

High-pressure processes are typically free radical initiated polymerizations and conducted in a tubular reactor or a stirred autoclave. In the tubular reactor, the pressure is within the range of about 25,000 to about 45,000 psi and the temperature is in the range of about 200 to about 350 C. In the stirred autoclave, the pressure is in the range of about 10,000 to about 30,000 psi and the temperature is in the range of about 175 to about 250 C.

Copolymers comprised of ethylene and unsaturated esters are well known and can be prepared by conventional high-pressure techniques. The unsaturated esters can be alkyl acrylates, alkyl methacrylates, or vinyl carboxylates. The alkyl groups typically have 1 to 8 carbon atoms, preferably 1 to 4 carbon atoms. The carboxylate groups typically have 2 to 8 carbon atoms, preferably 2 to 5 carbon atoms. The portion of the copolymer attributed to the ester comonomer can be in the range of about 5 to about 50 percent by weight based on the weight of the copolymer, preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate.

Examples of the vinyl carboxylates are vinyl acetate, vinyl propionate, and vinyl butanoate. The melt index of the ethylene/unsaturated ester copolymers is typically in the range of about 0.5 to about 50 g/10 min, preferably in the range of about 2 to about 25 g/10 min.

Copolymers of ethylene and vinyl silanes may also be used. Examples of suitable silanes are vinyltrimethoxysilane and vinyltriethoxysilane. Such polymers are typically made using a high-pressure process. Ethylene vinylsilane copolymers are particularly well suited for moisture-initiated crosslinking.

The VLDPE or ULDPE is typically a copolymer of ethylene and one or more α-olefins having 3 to 12 carbon atoms, preferably 3 to 8 carbon atoms. The density of the VLDPE or ULDPE is typically in the range of about 0.870 to about 0.915 g/cc. The melt index of the VLDPE or ULDPE is typically in the range of about 0.1 to about 20 g/10 min, preferably in the range of about 0.3 to about 5 g/10 min. The portion of the VLDPE or ULDPE attributed to the comonomer(s), other than ethylene, can be in the range of about 1 to about 49 percent by weight based on the weight of the copolymer, preferably in the range of about 15 to about 40 percent by weight.

A third comonomer can be included, e.g., another ∀-olefin or a diene such as ethylidene norbornene, butadiene, 1,4-hexadiene or a dicyclopentadiene. Ethylene/propylene copolymers are generally referred to as EPRs, and ethylene/propylene/diene terpolymers are generally referred to as an EPDM. The third comonomer is typically present in an amount of about 1 to about 15 percent by weight based on the weight of the copolymer, preferably present in an amount of about 1 to about 10 percent by weight. Preferably the copolymer contains two or three comonomers inclusive of ethylene.

The LLDPE can include VLDPE, ULDPE, and MDPE, which are also linear, but, generally, have a density in the range of about 0.916 to about 0.925 g/cc. The LLDPE can be a copolymer of ethylene and one or more α-olefins having 3 to 12 carbon atoms, preferably 3 to 8 carbon atoms. The melt index is typically in the range of about 1 to about 20 g/10 min, preferably in the range of about 3 to about 8 g/10 min.

Any polypropylene may be used in these compositions. Examples include homopolymers of propylene, copolymers of propylene and other olefins, and terpolymers of propylene, ethylene, and dienes (e.g. norbornadiene and decadiene). Additionally, the polypropylenes may be dispersed or blended with other polymers such as EPR or EPDM. Suitable polypropylenes include thermoplastic elastomers (TPEs), thermoplastic olefins (TPOs) and thermoplastic vulcanates (TPVs). Examples of polypropylenes are described in *Polypropylene Handbook: Polymerization, Characterization, Properties, Processing, Applications* 3-14, 113-176 (E. Moore, Jr. ed., 1996). The polypropylene must be functionalized with hydrolysable silane functional group grafted to the polymer chain backbone. Such functionalization is well-known in the art.

Vinyl alkoxysilanes (e.g., vinyltrimethoxysilane and vinyltriethoxysilane) are suitable silane compounds for grafting or copolymerization to form the silane-functionalized olefinic polymer.

The silane-grafted polymers and intermediates used to make silane-grafted polymers may be used alone or in combination with one or more additional polymers in a polymer blend. When additional polymers are present, they may be selected from any of the modified or unmodified homogeneous polymers described above for this invention and/or any modified or unmodified heterogeneous polymers.

Heterogeneous polyethylenes that are optionally combined with the silane-grafted polymers according to this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler Natta or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an .alpha.-olefin. HDPE is well known, commercially available in various grades, and may be used in this invention. Density is measured according to the procedure of ASTM D-792.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their processes of preparation. Heterogeneous linear ethylene polymers are available from The Dow Chemical Company as DOWLEX™ LLDPE and as ATANE™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, Mw/Mn, in the range of from 3.5 to 4.1. Relevant discussions of both of these classes of materials, and their processes of preparation are found in U.S. Pat. No. 4,950,541 and the patents to which it refers, all of which are incorporated herein by reference.

The catalysts of the compositions of this invention are distannoxanes. Distannoxanes are used herein to refer to tin catalysts in which the tin is formally in the +4 oxidation state and which comprise a chelating bis(alkoxide) ligand in addition to two hydrocarbyl ligands. The +4 oxidation state and chelating nature of the alkoxide groups are believed to impart thermal stability to the catalysts compared to other tin catalysts, such as stannous octoate.

The distannoxane catalyst may be a dialkyldioxastannolane, preferably 2,2-Di-n-butyl-1,3,2-dioxastannolane. 2,2-Di-n-butyl-1,3,2-dioxastannolane has been shown to exist principally as a dimer in solution and that the dimeric nature of this distannoxane catalyst likely causes the tin to be penta-coordinate in the solid state. While not wishing to be bound by any particular theory, the penta-coordinate nature of the catalyst may impart improved stability to the catalyst.

The catalyst includes other penta-coordinate or hexa-coordinate, non-dimeric tin catalysts such as illustrated by the following, non-limiting examples shown in FIG. 1.

The distannoxanes will yield the following times for 6 mV increase per mg of catalyst, as measured at 40° C. in accordance with the Brookfield viscometer based test method described below in the examples: 8000 min or less, preferably 5000 min or less, most preferably 3000 min or less, and even more preferably 1000 min or less.

Preferably, the distannoxane will comprise at least 0.01 wt %, more preferably at least 0.03 weight percent (wt %), most preferably, at least 0.05 wt % up to 1 wt %, more preferably up to 0.5 wt %, most preferably up to 0.2 wt %, all weight percents based on the total weight of the cross-linked or cross-linkable polymers in the composition.

These tin catalysts may be generated in situ by adding the individual catalyst components to the polymer melt. For example, see Journal of Cellular Plastics, Volume 38, 421-440, September 2002, in which an in situ synthesis of distannoxane catalyst during extrusion foaming to effect crosslinking of PP-EMA blends was described.

The distannoxane catalysts may be produced by the reaction of an alkyltin oxide and a diol. This generating reaction is a condensation reaction and the water generated in situ may help the subsequent silane cross-linking chemistry as well. Conveniently, the alkyltin oxide is dibutyl tin oxide (DBTO). The diol can be selected based on boiling point, reaction temperature and the desired reaction rate.

Examples of suitable diols include, inter alia, ethylene glycol 1,3-propanediol, 1,2-propanediol and 1,5-pentanediol. The boiling point of ethylene glycol (ca. 196° C.) may make this a less desirable diol for in situ generation of the catalyst, for high process conditions (e.g., 215° C. or higher) α-ω diols are more preferred for in situ application.

One embodiment is to synthesize the distannoxane from DBTO and diol while making a catalyst masterbatch. The raw materials could include DBTO, diol, antioxidants and polyethylene. By selecting the appropriate type of polyethylene, the compositions could be processed over a wide range of temperatures, for instance, 150° C. to 200° C. (depending on what is optimum for formation of the distannoxane without degradation of the polymer). Typically, a Banbury can be used to make the master batch, but one could conceivably make the compound on an extruder, if that is what it takes to control the formation of the distannoxane.

The distannoxane catalysts of the present invention have also been found to effectively catalyse other condensation reactions, particularly crosslinking of polymers or resins, including (but not limited to): urethane reactions (isocyanate groups reacting with hydroxyl groups) and amidation reactions (for example, reactions of acid groups with amines).

In the case of urethane reactions, if the resin or polymer has hydroxyl groups, crosslinking is achieved with compounds that have two or more isocyanate groups (for example, diisocyanates). And, if the resin or polymer has isocyanate groups, crosslinking is achieved with compounds that have two or more hydroxyl groups (for example, diols).

If the resin or polymer has acid groups, crosslinking is achieved with compounds that have two or more amine groups (such as diamines), And, if the resin or polymer has amine groups, crosslinking is achieved with compounds that have two or more acid groups (such as diacids). The amine is preferably primary or secondary.

The compositions of this invention may contain other components such as anti-oxidants, colorants, corrosion inhibitors, lubricants, anti-blocking agents, flame retardants, and processing aids. Suitable antioxidants include (a) phenolic antioxidants, (b) thio-based antioxidants, (c) phosphate-based antioxidants, and (d) hydrazine-based metal deactivators. Suitable phenolic antioxidants include methyl-substituted phenols. Other phenols, having substituents with primary or secondary carbonyls, are suitable antioxidants. One preferred phenolic antioxidant is isobutylidenebis(4,6-dimethylphenol). One preferred hydrazine-based metal deactivator is oxalyl bis(benzylidiene hydrazide). These other components or additives are used in manners and amounts known in the art. For example, the antioxidant is typically present in amount between about 0.05 and about 10 weight percent based on the total weight of the polymeric composition.

There are many types of molding operations which can be used to form useful fabricated articles or parts from the formulations disclosed herein, including various injection molding processes (e.g., that described in Modern Plastics Encyclopedia/89, Mid October 1988 Issue, Volume 65, Number 11, pp. 264-268, "Introduction to Injection Molding" and on pp. 270-271, "Injection Molding Thermoplastics", and blow molding processes (e.g., that described in Modern Plastics Encyclopedia/89, Mid October 1988 Issue, Volume 65, Number 11, pp. 217-218, "Extrusion-Blow Molding", profile extrusion, calendering, pultrusion and the like.

The silane-grafted polymers, processes for making them, and intermediates for making them of this invention are useful in the automotive area, industrial goods, building and construction, electrical (e.g., wire and cable coatings/insulation) and tire products. Some of the fabricated articles include automotive hoses, single ply roofing, and wire and cable voltage insulation and jackets.

Such articles comprising the silane-grafted polymer of this invention may be made by melt processing the silane-grafted polymer according to this invention. That process may include processing pellets or granules of polymer which have been silane-grafted according to this invention. In a preferred embodiment, the pellets or granules are substantially free of unreacted grafting agent when the grafting agent comprises a heat-activated grafting agent.

Suitable articles of manufacture include wire-and-cable insulations, wire-and-cable semiconductive articles, wire-and-cable coatings and jackets, cable accessories, shoe soles, multicomponent shoe soles (including polymers of different densities and type), weather stripping, gaskets, profiles, durable goods, rigid ultradrawn tape, run flat tire inserts, construction panels, composites (e.g., wood composites), pipes, foams, blown films, and fibers (including binder fibers and elastic fibers).

In one embodiment, the invention is wire or cable construction prepared by applying the polymeric composition over a wire or cable. The composition may be applied in any manner known in the art. In another embodiment, the invention is process of curing a composition comprising a silane-crosslinkable polymer using a distannoxane. Foam products include, for example, extruded thermoplastic polymer foam, extruded polymer strand foam, expandable thermoplastic foam beads, expanded thermoplastic foam beads, expanded and fused thermoplastic foam beads, and various types of crosslinked foams. The foam products may take any known physical configuration, such as sheet, round, strand geometry, rod, solid plank, laminated plank, coalesced strand plank, profiles, and bun stock.

The foams of the present invention may be used in any application where foams of comparable density and open or closed cell contents are used today. Such applications include, without limit, cushion packaging (for example, corner blocks, braces, saddles, pouches, bags, envelopes, overwraps, interleafing, encapsulation) of finished electronic goods such as computers, televisions, and kitchen appliances; packaging or protection of explosive materials or devices; material handling (trays, tote boxes, box liners, tote box inserts and dividers, shunt, stuffing, boards, parts spacers and parts separators); work station accessories (aprons, table and bench top covers, floor mats, seat cushions); automotive (headliners, impact absorption in bumpers or doors, carpet underlayment, sound insulation); flotation (for example, life jackets, vests and belts); sports and leisure or athletic and recreational products (for example, gym mats and bodyboards); egg cartons, meat trays, fruit trays, thermal insulation (such as that used in building and construction for wall sheathing, roofing, foundation insulation and residing underlayment); acoustical insulation (for example, for appliances and building and construction); pipe insulation, insulation for refrigeration, buoyancy applications (e.g., floating docks and rafts), floral and craft products, pallets, luggage liners, desk pads, footwear (including shoe soles), insulation blankets for greenhouses, case inserts, display foams, gaskets, grommets, seals; sound attenuation for printers and typewriters; display case insert; missile container padding; military shell holder; blocking and bracing of various items in transport; preservation and packaging; automotives anti-rattle pads, seals; medical devices, skin contact pads; cushioned pallet; and vibration isolation pad. The foregoing list merely illustrates a number of suitable applications. Skilled artisans can readily envision additional applications without departing from the scope or spirit of the present invention.

Examples 1 to 2 and Comparative Sample 1

In the case of Example 2, the catalyst was first placed in a vial and exposed to an elevated temperature of 205° C. In the case of Example 1 and Comparative Sample 1, the catalysts were not preconditioned at elevated temperature. This preconditioning of the catalyst was used to simulate the conditions encountered by the catalyst during the process of extrusion of the polymer. We have found that this preconditioning gives a better correlation between the solution screening method and the actual fabricated polymer.

A water-saturated sample of n-octane was prepared by mixing with 1 vol % water, and stirring for 1 hour at room temperature (22° C.). The two-phase mixture was allowed to settle for at least 1 hour, and the upper layer was decanted carefully to collect the water-saturated octane (i.e., "wet" octane). The solubility of water in octane at 22° C., as determined by Karl-Fischer titration, is 50 ppm. The "wet" octane (4.5 grams) was used to dissolve 500 mg. of poly(ethylene-co-octene) grafted with 1.6 wt % vinyltriethoxysilane (POE-g-VTES) at about 40° C. to obtain a clear and colorless solution comprising 1:9 w:w polymer:octane.

In the case of Comparative Example 1, 400 mg. of the catalyst (Di-n-Butyldilauryl tin) was added to dry n-octane to make 1000 mg (1.422 ml) of "catalyst solution" and the contents were stirred with a spatula. A fixed amount (0.200 mL) of this catalyst solution was added and mixed with the 5.0 grams of POE-g-VTES/octane solution (described above) using a syringe.

Examples 1 and 2 were prepared differently by directly adding 3.2 mg or 3.6 mg of distannoxane (2,2-Dibutyl-1,3,2-dioxastannolane) to the 5.0 gram of POE-g-VTES/octane solution, instead of first dissolving in n-octane, and mixing well (with spatula and syringe or with an ultrasonic cleaner) at 40° C. for 2 minutes. This approach was taken because the 2,2-Dibutyl-1,3,2-dioxastannolane was observed to be insoluble in "dry" octane.

A 1.5 ml portion of the final solution was loaded into a preheated (40° C.) Brookfield-HADVII cone and plate viscometer, and the CP 40 spindle was lowered onto the sample. The motor was started and the speed of rotation of the spindle was maintained at 2.5 rpm. The torque reading in mV was monitored over time. The increase in torque was a measure of the rate of crosslinking. The loadings of catalysts used are indicated below.

| | Catalyst Type | Pre-heated? | Physical Form | Mixed With |
|---|---|---|---|---|
| Comparative Example 1: | Di-n-Butyldilauryl tin (DBTDL) | No | Liquid | Spatula/syringe |
| Example 1: | 2,2-Dibutyl-1,3,2-dioxastannolane | No | Solid | Spatula/syringe |
| Example 2: | 2,2-Dibutyl-1,3,2-dioxastannolane | Yes | Solid | Ultra-sound |

The effective catalyst concentrations were as follows:
Effective Catalyst Concentration in 5.0 gram of POE-g-VTES/octane Solution
Comparative Example 1: =(400×0.2)=56.26 mg
Example 1: 3.6 mg
Example 2: 3.2 mg The results from the Brookfield viscometer are presented in FIG. 1, from which the following information was obtained.

|  | Initial viscosity (at 0 min) | Time for 2 mV increase from "initial" | Time for 6 mV increase from initial |
| --- | --- | --- | --- |
| Comparative Example 1: | 11.9 mV | 154 min | 280 min |
| Example 1: | 21.1 mV | 36 min | 55 min |
| Example 2: | 12.4 mV | 23 min | 49 min |

Assuming a linear effect of catalyst concentration on crosslinking kinetics, the following would be the corresponding times per mg of catalyst:

|  | Time for 2 mV increase | Time for 6 mV increase |
| --- | --- | --- |
| Comparative Example 1: | 8664 min | 15753 min |
| Example 1: | 130 min | 198 min |
| Example 2: | 74 min | 157 min |

The distannoxane (2,2-Dibutyl-1,3,2-dioxastannolane) of Examples 1 and 2 yielded desirably fast crosslinking. The distannoxane advantageously retained excellent catalytic activity even after prolonged exposure to elevated temperature. Furthermore, using ultrasound to mix the distannoxane appeared to result in faster crosslinking, presumably due to the creation of finer dispersion than that obtained with a spatula/syringe.

Examples 3 and 4 and Comparative Sample 2 and 3

Figure 2:
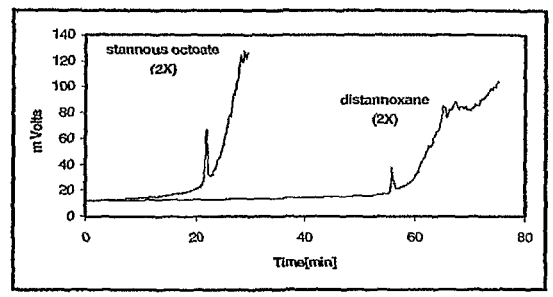
FIG. 2 is a graph comparing the viscosity over time of a silane-grafted ethylene-octene copolymer catalyzed by either a distannoxane or stannous octoate.

A distannoxane catalyst (Dibutyltin ethylene glycolate) was prepared by condensation reaction between DBTO and ethylene glycol. Although it was not as fast as stannous octoate when not exposed to elevated temperatures before the test (see figure below), the fact that this Dibutyltin ethylene glycolate catalyst has been observed to perform well at 210° C. indicates that it potentially may also have superior thermal stability in system. A fixed concentration of the Dibutyltin ethylene glycolate catalyst (Example 3) and Stannous octoate (Comparative Sample 2) catalyst was dissolved in a 10% solution of POE-g-VTES in wet octane (50 ppm water). The increase in viscosity over time was measured at a test temperature of 40° C. with the results shown in FIG. 2. You will notice that there is an initial "peak", the size and position of which is different with both catalysts.

Figure 3:
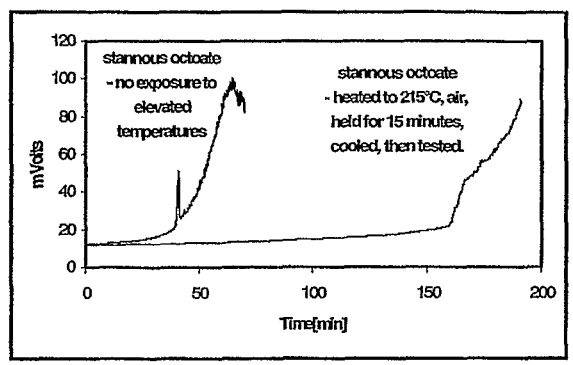
FIG. 3 is a graph showing the viscosity over time of a silane-grafted ethylene-octene copolymer catalyzed stannous octoate wherein the stannous octoate was subjected to a cycle of preheating.

FIG. 3 shows the effect of exposing stannous octoate to elevated temperature (215° C.) before evaluating it in the screening test at 40° C. The catalyst concentration was 1×. Not only was the catalytic activity slower after exposure to higher temperature, but the "peak" had also disappeared.

Figure 4:
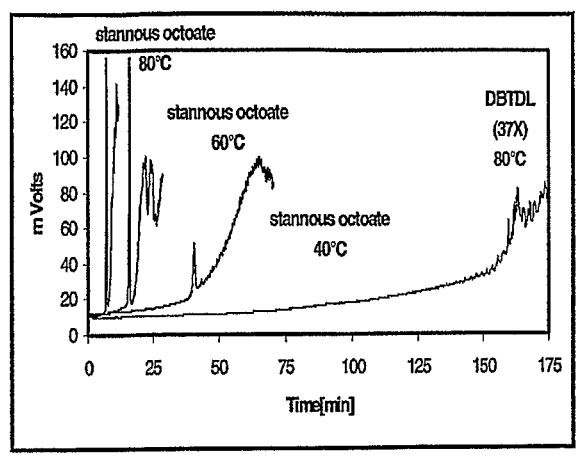
FIG. 4 is a graph demonstrating the effect of temperature on the cross-linking reaction.

FIG. 4 shows the effect of test temperature (40° C., 60° and 80° C.) on 1× concentration of stannous octoate, and one run with 37× concentration of DBTDL at 80° C. The catalysts were not preconditioned at elevated temperatures. Clearly, the stannous octoate retained excellent catalytic activity over this temperature range, with the "onset" of crosslinking occurring faster with increasing temperature (as expected). However, the size of the initial "peak" increased dramatically. In contrast, no peak was observed with DBTDL at a test temperature of 80° C.

Example 5 and Comparative Samples 4 to 7

A distannoxane catalyst (Dibutyltin ethylene glycolate) was prepared by condensation reaction between DBTO and ethylene glycol.

The reaction kinetics of 4-hydroxy TEMPO (h-TEMPO) with stearyl isocyanate were followed using the distannoxane, other different catalysts and uncatalyzed. The disappearance of the N=C=O band near 2271 $cm^{-1}$, as well as the appearance of the urethane C=O band near 1726 $cm^{-1}$ was monitored by FT-IR spectroscopy.

All samples were prepared as 1:1 molar mixtures of h-TEMPO: stearyl isocyanate with approximately 0.1% of the chosen catalyst (except Tyzor TEAZ, which was used at a concentration of 0.8 wt %). The reactants were melted at 80 degrees Celsius and the appropriate catalyst was added to the h-TEMPO, mixed on a vortex mixer, and reheated to 80 degrees Celsius for approximately 1 min. The two liquids were then poured together, mixed on a vortex mixer, and an aliquot was used for the analysis.

Spectra were collected on a Nicolet Magna 750 FT-IR spectrometer via transmission. The samples were prepared as capillary films pressed between salts. The salts were then placed in a heatable cell holder connected to a digital temperature controller. Resolution was set at 4 $cm^{-1}$ and 64 scans were co added to enhance signal to noise ratio. The spectra were processed with triangular apodization. The reactions were monitored over time at 130 degrees Celsius. The following were the reaction times for the disappearance of the isocyanate band, and the urethane formation followed the same trends:

Example 5: Distannoxane approximately 1 minute
Comparative sample 4: Uncatalyzed about 210 minutes
Comparative sample 5: Dibutyl Tin Dilaurate about 5 to 7 minutes
Comparative sample 6: Tyzor TPT about 4 to 5 minutes
Comparative sample 7: Tyzor TEAZ about 6 minutes The distannoxane of the present invention yielded substantially faster isocyanate loss and urethane formation than the other catalysts.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wire or cable comprising one or more of a jacket, insulation or semi-conductive layer wherein the jacket, insulation or semi-conductive layer comprises a moisture-curable composition comprising at least one polyolefin resin having hydrolysable reactive silane groups and a distannoxane tin catalyst, the distannoxane tin catalyst having a bis(alkoxide) ligand and characterized by the tin having a +4 oxidation state, and the polyolefin resin is a copolymer of poly(ethylene-co-octene) and a hydrolysable silane.

2. The wire or cable of claim 1 wherein the distannoxane tin catalyst is penta-coordinate or hexa-coordinate.

3. The wire or cable of claim 2, wherein the distannoxane catalyst is 2,2-Di-n-butyl-1,3,2-dioxastannolane.

4. A wire or cable comprising a jacket wherein the jacket comprises a moisture-curable composition comprising (i) the reaction product of at least one polyolefin resin having hydrolysable reactive silane groups and water, and (ii) at least one distannoxane tin catalyst, the distannoxane tin catalyst having a bis(alkoxide) ligand and characterized by the tin having a +4 oxidation state, and the polyolefin resin is a copolymer of poly(ethylene-co-octene) and a hydrolysable silane.

5. The wire or cable of claim 4 wherein the distannoxane tin catalyst is penta-coordinate or hexa-coordinate.

6. The wire or cable of claim 4, wherein the distannoxane is 2,2-Di-n-butyl-1,3,2-dioxastannolane.

7. A process for preparing a jacketed wire or cable, the process comprising the steps of: applying a coating of the moisture-curable composition of claim 1 onto a wire or cable; and reacting the moisture-curable composition with water.

8. The process of claim 7 wherein the distannoxane tin catalyst is penta-coordinate or hexa-coordinate.

9. The process of claim 8, wherein the distannoxane is 2,2-Di-n-butyl-1,3,2-dioxastannolane.

10. The process of claim 7 further comprising the step of producing the distannoxane tin catalyst in situ by a condensation reaction of an alkyltin oxide and a diol.

11. The process of claim 10, wherein the diol is at least one of: 1,3-propanediol; 1,2-propanediol; ethylene glycol; or 1,5-pentanediol.

12. An article of manufacture comprising a moisture-curable composition comprising at least one polyolefin resin having hydrolysable reactive silane groups and a distannoxane tin catalyst, the distannoxane tin catalyst having a bis(alkoxide) ligand and characterized by the tin having a +4 oxidation state, and the polyolefin resin is a copolymer of poly(ethylene-co-octene) and a hydrolysable silane.

13. The article of manufacture of claim 12 wherein the article is selected from the group consisting of wire-and-cable insulations, wire-and-cable semiconductive articles, wire-and-cable coatings, wire-and-cable jackets, cable accessories, shoe soles, multicomponent shoe soles, weather stripping, gaskets, profiles, durable goods, rigid ultradrawn tape, run flat tire inserts, construction panels, composites, pipes, foams, blown films, and fibers.

14. A process for preparing the article of manufacture of claim 12, the process comprising the step of reacting the moisture-curable composition with water.

* * * * *